(12) United States Patent  
Cornell

(10) Patent No.: US 7,306,006 B1
(45) Date of Patent: Dec. 11, 2007

(54) MULTI-FUNCTION FLUID COMPONENT

(75) Inventor: Gary L. Cornell, Moreno Valley, CA (US)

(73) Assignee: Blacoh Fluid Controls, Inc., Riverside, CA (US)

( * ) Notice: Subject to any disclaimer, the term of this patent is extended or adjusted under 35 U.S.C. 154(b) by 104 days.

(21) Appl. No.: 11/171,855

(22) Filed: Jun. 29, 2005

Related U.S. Application Data

(63) Continuation-in-part of application No. 10/410,964, filed on Apr. 10, 2003, now abandoned.

(51) Int. Cl.
*F16L 55/054* (2006.01)
*F15B 1/16* (2006.01)

(52) U.S. Cl. .............. 137/565.01; 138/30; 138/114

(58) Field of Classification Search .......... 137/565.01; 138/26, 30, 114; 285/136.1
See application file for complete search history.

(56) References Cited

U.S. PATENT DOCUMENTS

| | | | |
|---|---|---|---|
| 916,136 A | 3/1909 | Ford | |
| 2,261,948 A | 11/1941 | Beach | |
| 2,593,316 A | 4/1952 | Kraft | |
| 2,712,831 A | 7/1955 | Day | |
| 2,838,073 A | 6/1958 | Di Mattia et al. | |
| 2,908,294 A | 10/1959 | Di Mattia et al. | |
| 3,063,470 A | 11/1962 | Forster | |
| 3,091,258 A | 5/1963 | Marette | |
| 3,103,234 A | 9/1963 | Washburn | |
| 3,473,565 A | 10/1969 | Blendermann | |
| 3,878,867 A | 4/1975 | Dirks | |
| 4,512,514 A | 4/1985 | Elcott | |
| 4,705,077 A | 11/1987 | Sugimura | |
| 4,732,175 A | 3/1988 | Pareja | |
| 4,759,387 A | 7/1988 | Arendt | |
| 4,936,383 A | 6/1990 | Towner et al. | |
| 5,171,134 A | 12/1992 | Morgart et al. | |
| 5,253,374 A | 10/1993 | Langill | |
| 5,562,429 A | 10/1996 | Romstad et al. | |
| 5,860,452 A | 1/1999 | Ellis | |
| 5,941,283 A | 8/1999 | Forte | |
| 6,264,069 B1 | 7/2001 | Hughes et al. | |
| 6,318,978 B1 | 11/2001 | Burns | |

*Primary Examiner*—John Rivell
(74) *Attorney, Agent, or Firm*—Christie, Parker & Hale, LLP.

(57) ABSTRACT

Apparatus for dampening pulsations in a fluid system has a radially expandable tube connected in the fluid system. A flexible outer shell surrounds the tube to form with the tube an annular chamber. The annular chamber is pressurized by a compressed gas or other fluid to dampen fluid pulsations that act upon the tube. Annular end caps connect the tube and the shell. At each end, the tube has an extension with a threaded connection to a bushing; the bushing has a threaded connection to the inner annulus of the end cap.

14 Claims, 7 Drawing Sheets

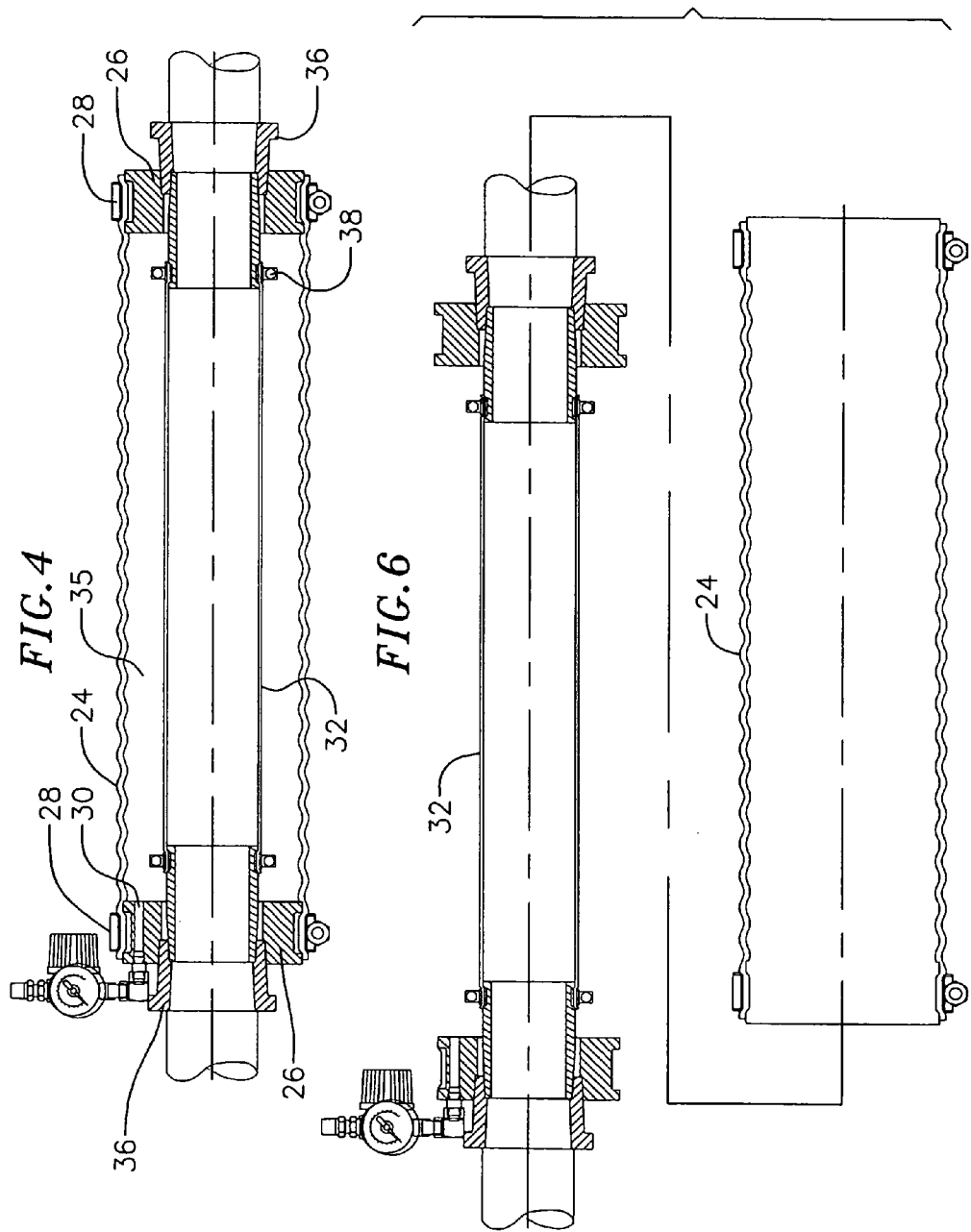

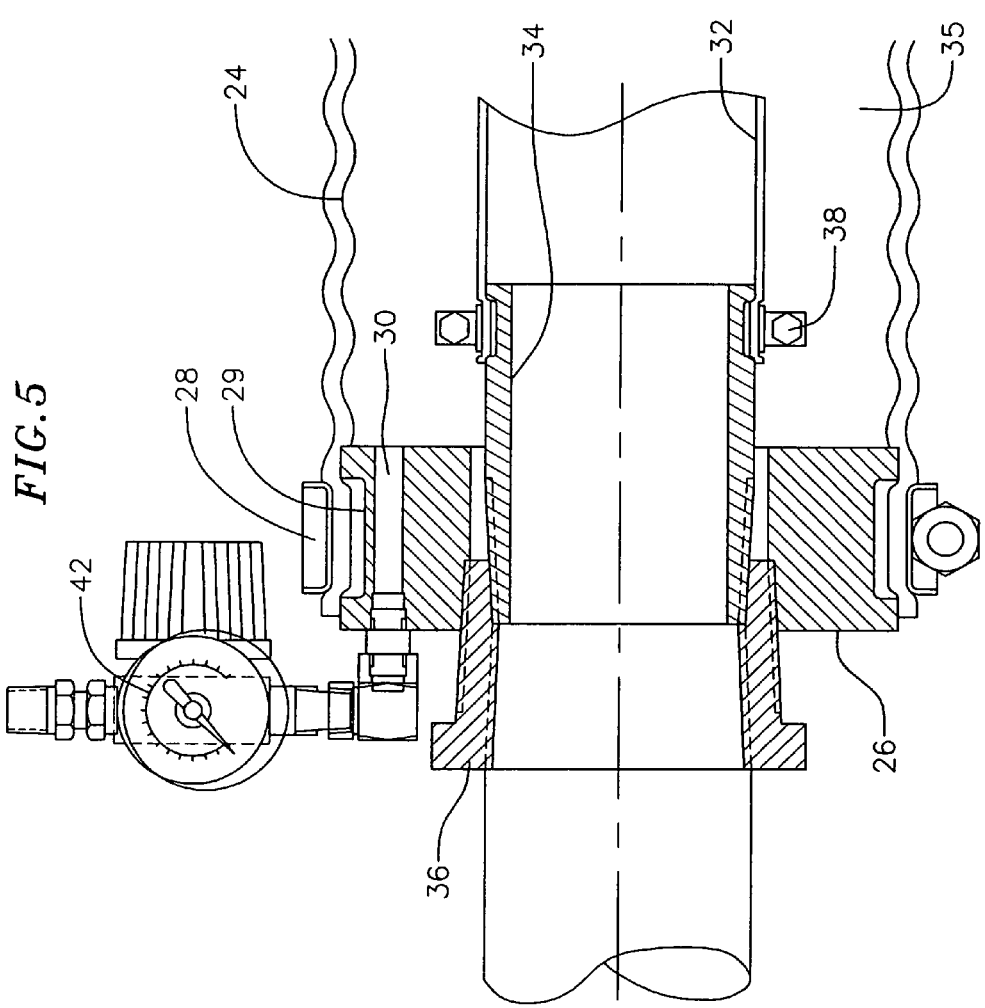

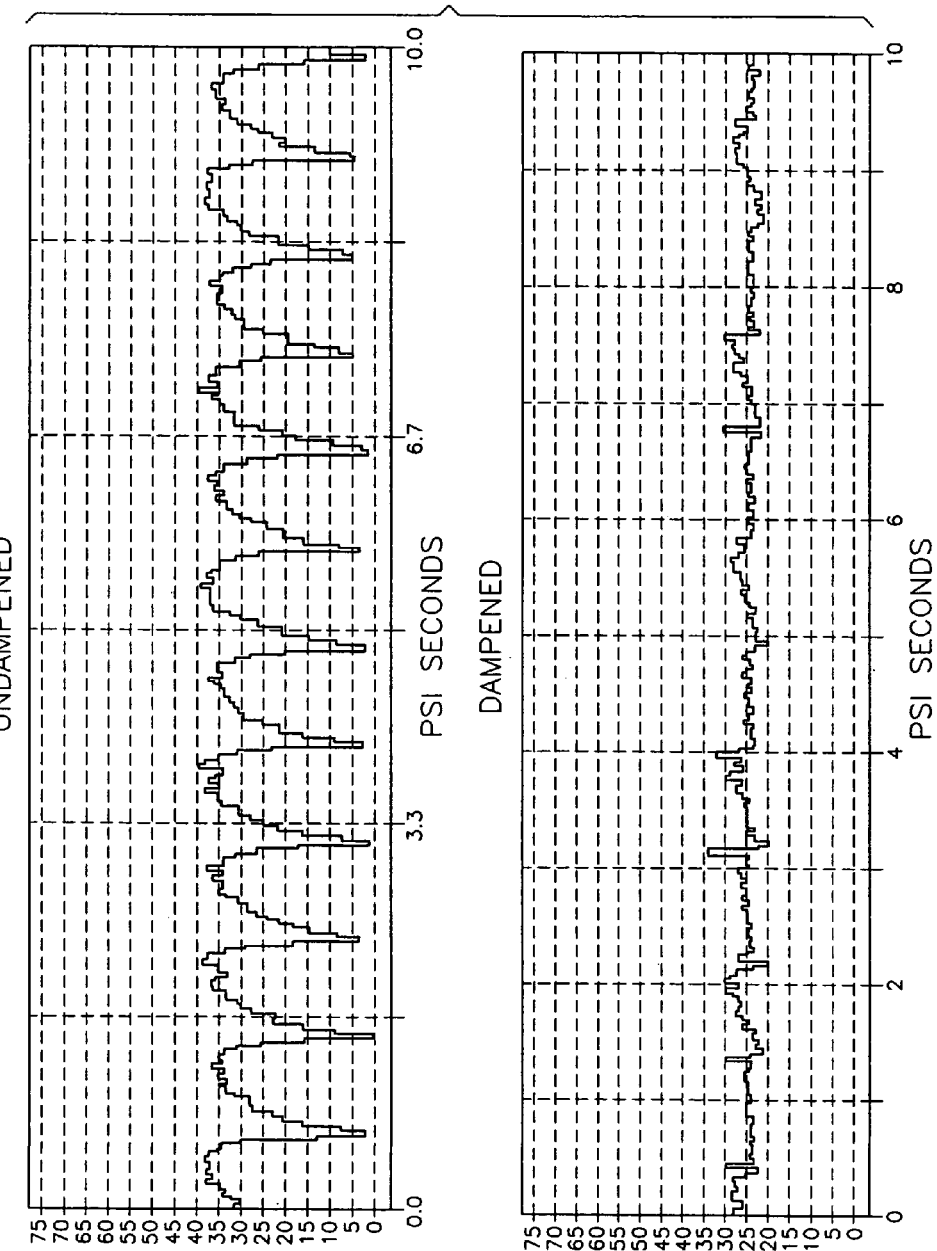

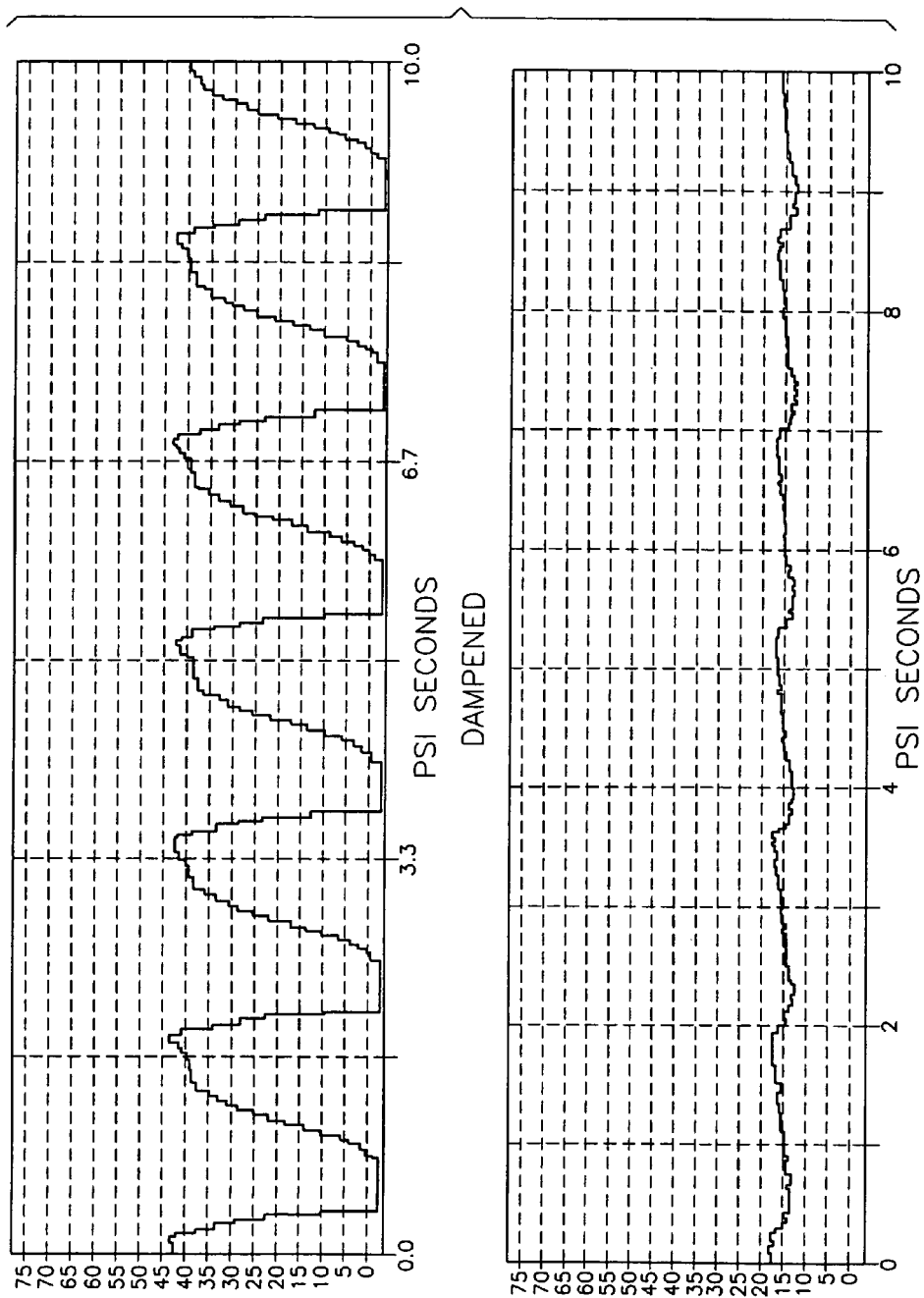

MULTI-FUNCTION FLUID COMPONENT

CROSS-REFERENCE TO RELATED APPLICATION

This application is a continuation-in-part of U.S. application Ser. No. 10/410,964, filed Apr. 10, 2003, now abandoned the disclosure of which is incorporated fully herein by this reference.

BACKGROUND OF THE INVENTION

This invention relates to fluid flow components, and more particularly, to a fluid flow component that performs multiple functions in a fluid system.

Some considerations that a designer takes into account when designing a fluid system are fluid pulsations, mechanical vibrations, and misalignment of the connecting parts. Pulsation dampeners are used in fluid systems to reduce the effects of a fluid disturbing event, such as might be induced by a pump or valve. Vibration isolators are used in fluid systems to prevent transmission of vibrations. Alignment compensating couplings are used to reduce the stress placed on the interconnecting parts. Sometimes, two or more of these components are used in series in a fluid system.

SUMMARY OF THE INVENTION

According to the invention, a single fluid component performs multiple functions in a fluid system. A radially expandable tube is connected in the fluid system. A flexible outer shell surrounds the tube to form with the tube an annular chamber. The annular chamber is pressurized by a compressed gas or other fluid to dampen fluid pulsations that act upon the tube. As a result, the component can suppress pulsations, isolate the fluid system from pump and external vibrations, compensate for misalignment of the connections between components, and act as an acoustic isolator between the pump and the fluid system including the piping, which is rigid and inflexible.

A feature of the invention is an annular end cap connecting the tube and the shell at each end. The tube has an extension with a threaded connection to a bushing. The bushing has a threaded connection to the inner annulus of the end cap.

BRIEF DESCRIPTION OF THE DRAWINGS

The features of specific embodiments of the best mode contemplated of carrying out the invention are illustrated in the drawings, in which:

FIG. 4 is an assembled view of the component of FIG. 3 in side section;

FIG. 5 is a detailed side sectional view of one of the end caps of FIG. 4;

FIG. 6 is a side sectional view of the component of FIG. 3 with the outer shell removed; and FIGS. 7 and 8 are diagrams representing pressure pulsations in a fluid system with and without the component of FIG. 3.

DETAILED DESCRIPTION OF A SPECIFIC EMBODIMENT

Figure 1:
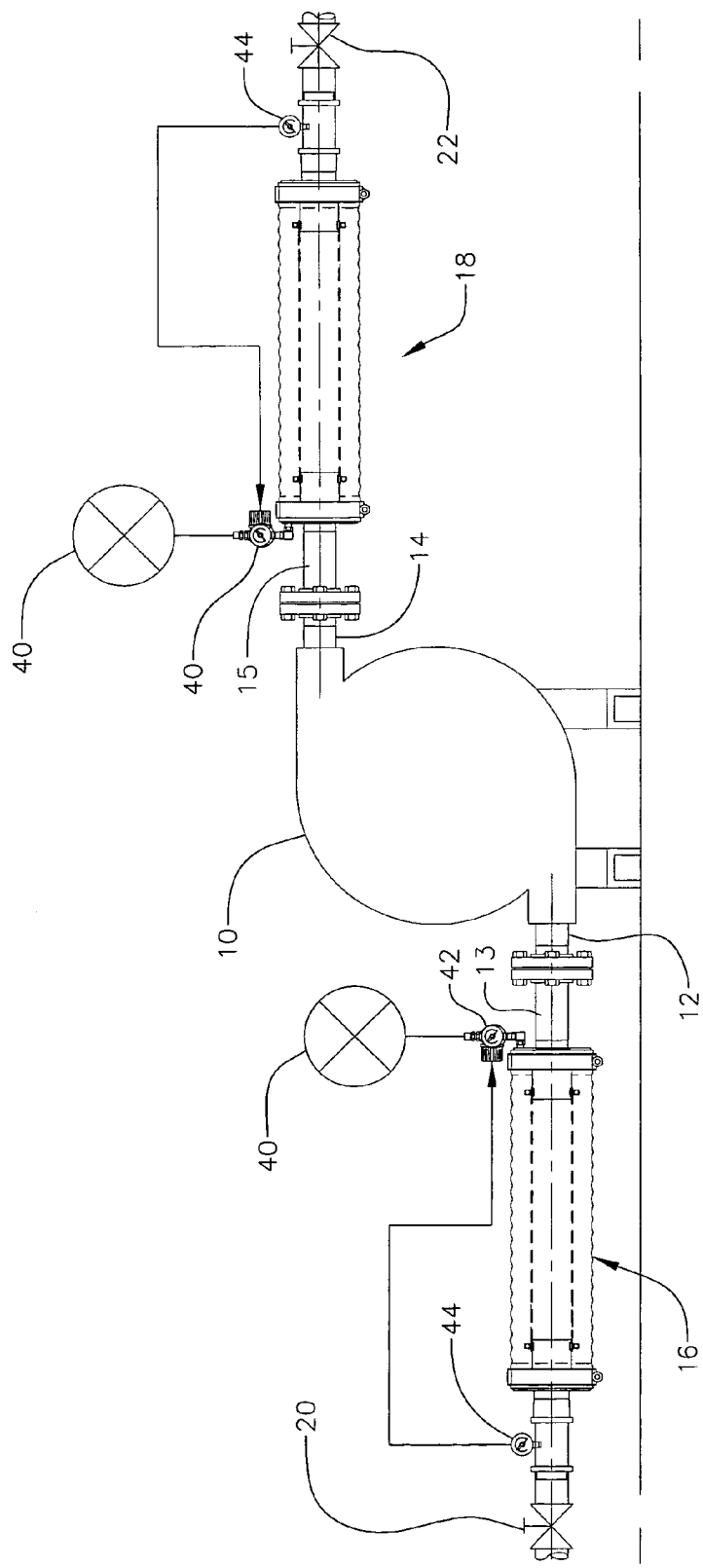
FIG. 1 is a schematic diagram of one fluid system using the invention.

In FIG. 1 a pump 10 has an outlet 12 and a return 14 connected in a fluid flow system. Pump 10 is configured to maintain the flow direction. A fluid component 16 is connected to outlet 12 and a fluid component 18 is connected to return 14 by inflexible and rigid, e.g., metal, piping 13 and 15 respectively. Fluid flows from outlet 12 of pump 10 through piping 13, component 16, the remainder of the fluid system, component 18, piping 15, and back to return 14 of pump 10. As a result of the rigid and inflexible piping, the vibrations of pump 10 are transmitted to fluid components 16 and 18. Preferably, components 16 and 18 are the same. Components 16 and 18 suppress pulsations produced by pump 10, isolate the fluid system from vibrations caused by pump 10, and compensate for misalignment between the connections between pump 10 and the fluid system. A manual valve 20 regulates the flow rate at outlet 12 and a manual valve 22 regulates the flow rate at return 14. Typically, the system fluid is a liquid.

Figure 2:
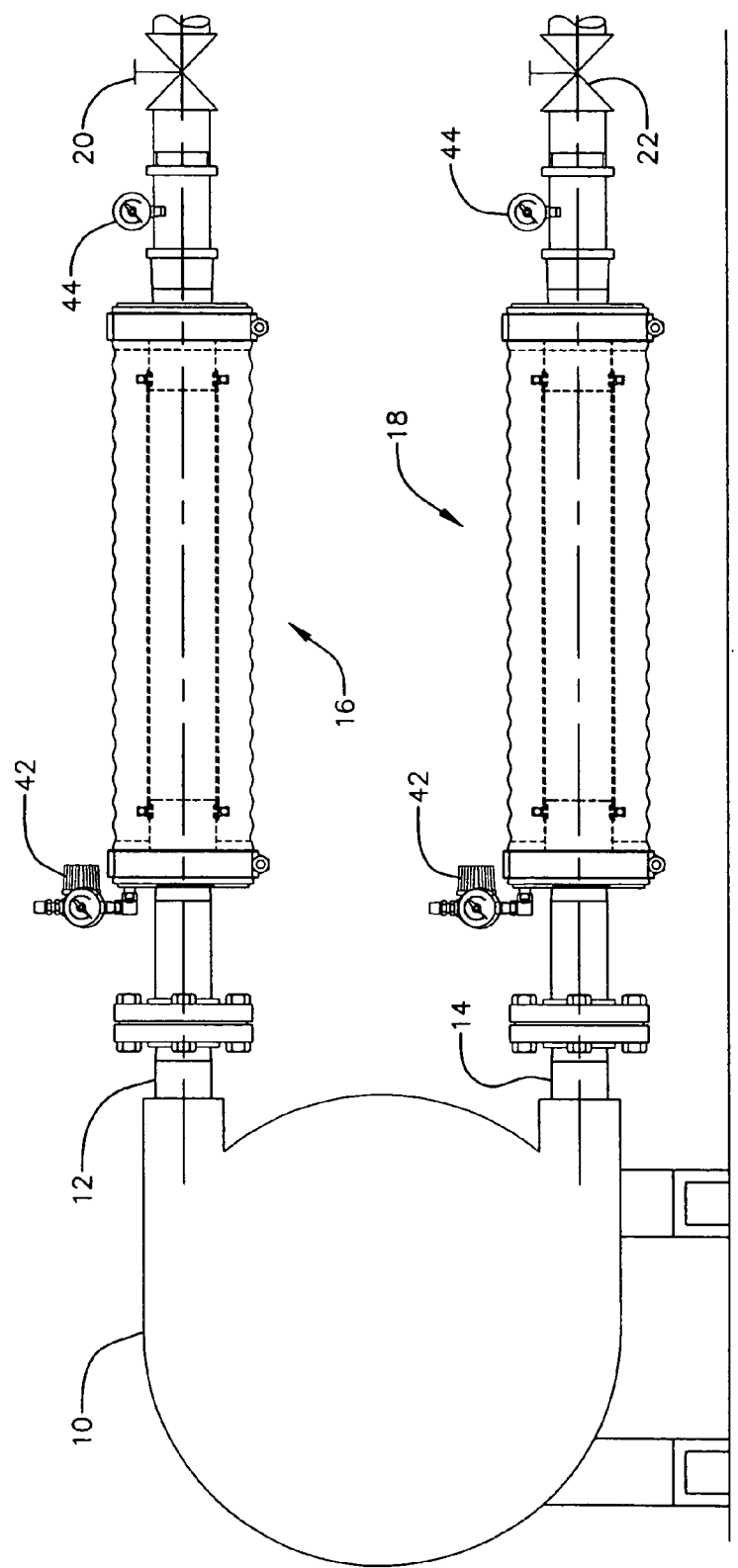
FIG. 2 is a schematic diagram of another fluid system using the invention.

In FIG. 2, pump 10 is configured to reverse the flow direction. Otherwise, the reference numerals represent the elements as FIG. 1.

Figure 3:
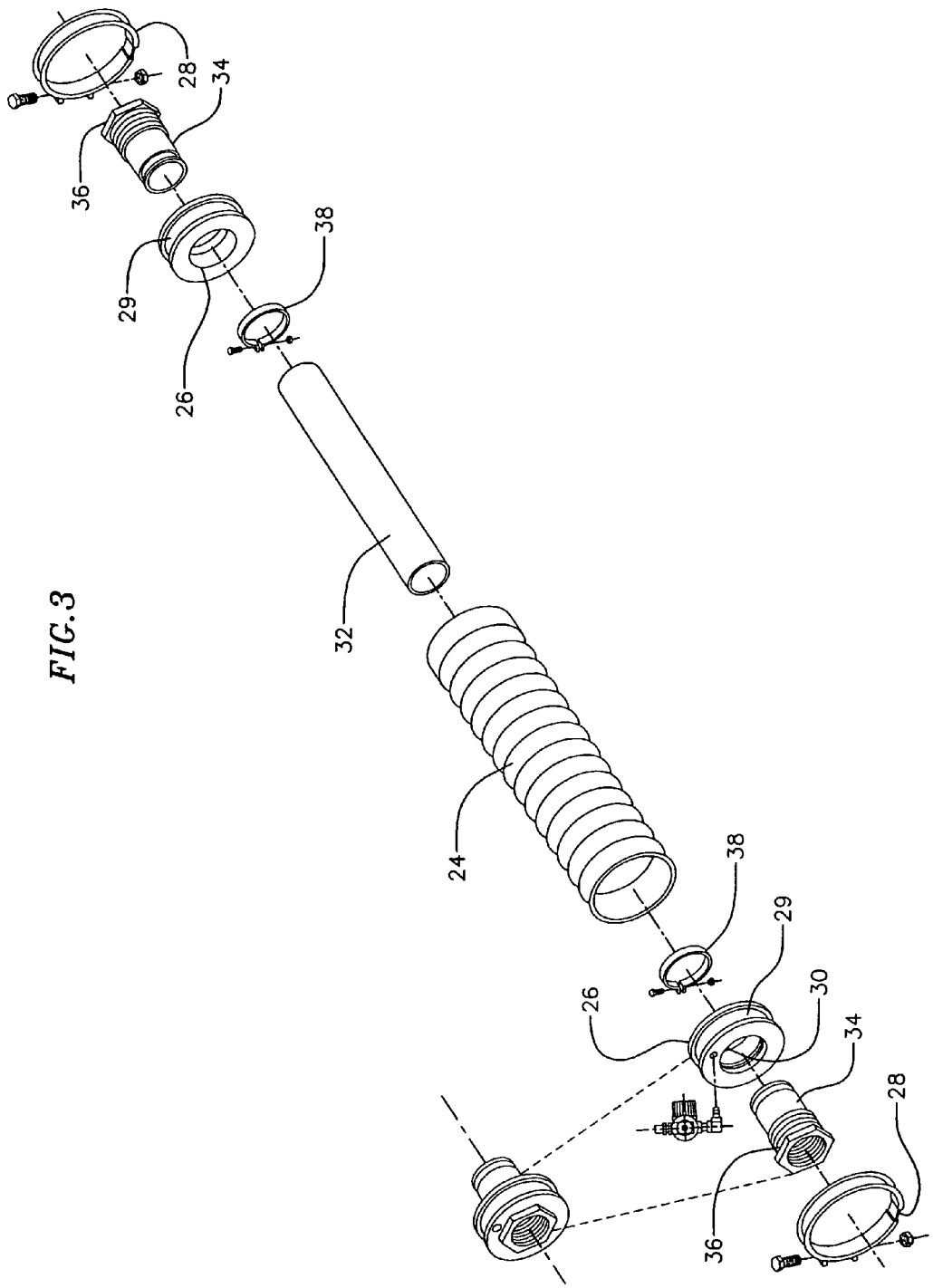
FIG. 3 is an exploding view of a component that incorporates principles of the invention.

FIG. 3 shows an exploded view of component 16 or 18 and FIG. 4 shows an assembled view of component 16 or 18. A flexible corrugated tube case or shell 24 retains its shape and diameter under pressure and absorbs the vibrations of pump 10. To exhibit these characteristics, tube case 24 is preferably made of a corrugated wire or fiber reinforced elastomer. At each end, tube case 24 is secured to an annular end cap 26 by a removable band clamp 28. An annular channel 29 runs around the outer annulus of end cap 26 under band clamp 28. A radially expandable flex tube 32 is held in approximately axial alignment with tube case 24 at each end by an extension 34 and a bushing 36. Preferably, flex tube 32 is made from an elastomer or other non-reinforced material so it can expand radially under pressure. A port 30 for introduction of pressurized gas is formed in one of end caps 26. An annular pressurized chamber 35 is defined by radially expandable flex tube 32, end caps 26, and tube case 24.

Extension 34 and a bushing 36 are shown in detail in FIG. 5. Extension 34 is secured to flex tube 32 by a removable band clamp 38. The diameter of tube case 24 is slightly larger that the outer annulus of end caps 26. In use, band clamp 28 is tightened down on the outer annulus of end caps 26 to press it into annular channel 29. Extension 34 has external threads that engage internal threads on bushing 36. Bushing 36 also has external threads that engage internal threads on the inner annulus surface of end cap 26. Bushing 36 serves as the outlet/return, where connections to the remainder of the fluid system are made.

Gas or other fluid under pressure from a source 40 is introduced into annular chamber 35 through a control valve 42 and port 30. Fluid source 40 pressurizes the annular chamber to a pressure between atmospheric pressure and 150 psi. Pulsations in the system fluid caused by the operation of pump 10 radially expand flex tube 32. This expansion is resisted by the pressurized gas in chamber 35, which dampens the pulsations. The degree of dampening is adjusted by control valve 42. If desired, the adjustment could be made automatically, depending upon the pressure of the system fluid. Specifically, control 42 is regulated responsive to a pressure gauge 44 disposed in the fluid system. As a result when the pressure of the system fluid increases, the gas pressure in chamber 35 increases to keep the pressure difference constant.

Preferably, the ratio of the pressurized gas volume in annular chamber 35 to the liquid volume in flex tube 32 is sufficient to prevent flex tube 32 from collapsing, which would restrict flow through the fluid system. This ratio is governed by the volumes and pressures in annular chamber 35 and tube case 24. If this ratio is followed, no mandrel is required to support flex tube 32

It should be noted that tube case 24 performs two functions—it serves as an outer shell or case for annular chamber 35 and as a vibration isolator for pump 10. In addition, tube case 24 functions to compensate for misalignment at the point of connection of pump 10 to the piping of the fluid system. If desired the described outer shell could be used to define the annular chamber with other types of pulsation dampeners, e.g., that disclosed in U.S. Pat. No. 3,063,470.

It should also be noted that the described construction minimizes the "wetted" parts in the component. Only extension 34, bushing 36, and flex tube 32 are exposed to the system fluid. The remaining parts can be designed without concern for the characteristics of the system fluid, e.g., corrosiveness.

The described construction also permits easy access to flex tube 32 for maintenance purposes. Tube case 24 has a slightly larger diameter than the outer annulus of end cap 26. Without disconnecting flex tube 32, extension 34, bushing 36, or end cap 26 from the piping of the fluid system, band clamps 28 are removed or loosened to free tube case 24. Tube case 24 is then slid over one of end caps 26 to expose flex tube 32 for servicing as illustrated in FIG. 6.

FIGS. 7 and 8 are diagrams that illustrate the effect of the described component on pumps in a typical fluid system. FIG. 7 represents the pulsations produced by a peristaltic pump and FIG. 8 represents the pulsations produced an air operated double diaphragm pump. The x-axis in each case represents time and the y-axis represents pressure. In each case, the top diagram represents the pulsations without the described component and the bottom diagram represents the dampened pulsations with the described component.

The described component can be capped off at one end and be used in a tee configuration as a stub to dampen pulsations in a fluid system. It can be used to dampen pulsations produced in fluid systems by other types of disturbances, such as valves for example.

The described embodiments of the invention are only considered to be preferred and illustrative of the inventive concept; the scope of the invention is not to be restricted to such embodiments. Various and numerous other arrangements may be devised by one skilled in the art without departing from the spirit and scope of this invention. For example, the disclosed vibration isolator could be used with pulsation dampeners of other designs or the disclosed pulsation dampener could be used with vibration isolators of other designs.

What is claimed is:

1. Apparatus for damping pulsations in a fluid system in which a vibration generating component is connected, the apparatus comprising:

a radially expandable tube connected in the fluid system;

a flexible corrugated outer shell surrounding the tube to form with the tube an annular chamber, the outer shell retaining its shape and diameter under pressure; and a fluid source pressurizing the annular chamber to dampen fluid pulsations generated by the component and isolate the component from the remainder of the fluid system.

2. The apparatus of claim 1, in which the tube is non-reinforced to promote radial expansion.

3. The apparatus of claim 2, in which the tube is made of an elastomeric material.

4. The apparatus of claim 2, in which the shell is reinforced to resist radial expansion.

5. The apparatus of claim 4, in which the shell is reinforced with fabric.

6. The apparatus of claim 4, in which the shell is reinforced with wire.

7. The apparatus of claim 1, in which the fluid source pressurizes the annular chamber to a pressure between atmospheric pressure and 150 psi.

8. The apparatus of claim 1, additionally comprising means for sensing the pressure in the system and means responsive to the pressure sensing means for changing the pressurization of the annular chamber to compensate for the pressure in the system.

9. The apparatus of claim 1, additionally comprising an end connection between each end of the tube and the shell.

10. The apparatus of claim 9, in which each end connection has an annular plate secured to the shell and the tube, the annular plate having an outer circumference and a threaded inner circumference.

11. The apparatus of claim 10, in which the shell is removably secured to the outer circumference of the annular plate by an adjustable band.

12. The apparatus of claim 11, in which the tube is secured to the inner circumference by a threaded extension of the tube, and a bushing having external threads mating with the threaded inner circumference of the annular plate and internal threads mating with the threaded extension of the tube.

13. A method of removing the tube of claim 11 from the shell of claim 11, comprising the steps of:

adjusting the band to release the shell; and sliding the shell off the tube to expose the tube for servicing.

14. The apparatus of claim 1, in which the component is a pump.

* * * * *